United States Patent
Boorstin et al.

(10) Patent No.: US 12,079,606 B2
(45) Date of Patent: Sep. 3, 2024

(54) SMART CONTRACT DISTRIBUTION INFRASTRUCTURE

(71) Applicant: Circle Internet Financial, Inc., Boston, MA (US)

(72) Inventors: Marcus Boorstin, Cambridge, MA (US); Oleg Zenchenko, Miami, FL (US); Sarah Martin, Cambridge (CA)

(73) Assignee: Circle Internet Financial Limited, Dublin (IE)

( * ) Notice: Subject to any disclaimer, the term of this patent is extended or adjusted under 35 U.S.C. 154(b) by 213 days.

(21) Appl. No.: 17/949,919

(22) Filed: Sep. 21, 2022

(65) Prior Publication Data
US 2024/0094998 A1 Mar. 21, 2024

(51) Int. Cl.
*G06F 8/41* (2018.01)
*G06F 8/60* (2018.01)
*G06Q 20/38* (2012.01)

(52) U.S. Cl.
CPC ............... *G06F 8/433* (2013.01); *G06F 8/60* (2013.01); *G06Q 20/389* (2013.01)

(58) Field of Classification Search
CPC .......... G06Q 20/389; G06F 8/60; G06F 8/433
See application file for complete search history.

(56) References Cited

U.S. PATENT DOCUMENTS

| | | | | |
|---|---|---|---|---|
| 2005/0039187 A1* | 2/2005 | Avakian | .............. | G06F 11/3476 |
| | | | | 719/310 |
| 2021/0319438 A1* | 10/2021 | Liu | .................... | G06Q 20/3829 |
| 2022/0012367 A1* | 1/2022 | Ramanan | ................. | G06N 3/08 |
| 2022/0111960 A1* | 4/2022 | Tran | ....................... | B64U 30/29 |

FOREIGN PATENT DOCUMENTS

| | | | | | |
|---|---|---|---|---|---|
| CN | 112835975 A | * | 5/2021 | ............. | G06F 16/27 |
| CN | 115495087 A | * | 12/2022 | ............... | G06F 8/41 |
| EP | 3961438 A1 | * | 3/2022 | ........... | G06F 21/125 |

OTHER PUBLICATIONS

Ahrendt et al., "Verification of Smart Contract Business Logic" (Year: 2022).*
Shi et al., "A Bytecode-based Approach for Smart Contract Classification" (Year: 2022).*

* cited by examiner

*Primary Examiner* — Phillip H Nguyen
(74) *Attorney, Agent, or Firm* — Patterson + Sheridan, LLP

(57) ABSTRACT

Certain aspects of the present disclosure provide techniques for building libraries for invoking smart contracts on a blockchain. The method generally includes compiling first source code in a first programming language defining a smart contract comprising a set of operations to be executed on a blockchain into bytecode for the smart contract based on one or more of information about a compiler to be used to compile the first source code or dependencies specified in the first source code. The bytecode for the smart contract is wrapped in second source code in a second programming language. The second source code is compiled into a portion of a library package through which the smart contract can be programmatically invoked, wherein the portion of the library package specifies version information associated with the smart contract. The library package is deployed for use with the blockchain.

20 Claims, 4 Drawing Sheets

SMART CONTRACT DISTRIBUTION INFRASTRUCTURE

INTRODUCTION

Aspects of the present disclosure relate to transaction processing in blockchain systems.

Public ledgers can be used in various decentralized systems to provide a ledger of transactions that have occurred within these decentralized systems. These public ledgers may include blockchains, hash graphs, or the like. Generally, a blockchain-based ledger may include a chain of blocks, in which the latest block includes some information about a transaction that occurred and a reference to an immediate predecessor block, which may be a hashed value of the previous block. Because the reference to the immediate predecessor block may be a value derived from the immediate predecessor block, verification of the transactions in the blockchain may be performed by ensuring that a hash of a block resolves to the same value as that stored as a reference to the immediate predecessor block in a succeeding block in the blockchain. If there is a mismatch between a computed hash of a block and the hashed value of the block in a succeeding block in the blockchain, validation of the blockchain may fail. In a hash graph-based ledger, transactions may be represented as nodes in a directed acyclic graph in which nodes representing newer transactions are linked to nodes representing older transactions referenced by these newer transactions.

In some cases, transactions may be performed on a blockchain through the execution of a smart contract. Generally, a smart contract is computer-executable code that defines an operation, or series of operations, to be performed in order to perform a transaction that is recorded on a blockchain. To deploy a smart contract, code defining a smart contract, including references to external libraries, may be compiled using a compiler that is configured to compile smart contract code into executable code that can be invoked on a blockchain (e.g., by an application that interacts with the blockchain).

Generally, services in a computing environment may rely on specific versions of a smart contract in order to perform transactions on the blockchain. However, in many cases, there may be a large number of different versions of a smart contract which may have different method or event signatures and may operate differently from other versions of the same smart contract. To integrate a smart contract into use by a service in a computing environment, a service developer can, in some cases, retrieve a specific version of a smart contract from a larger overall repository. If, however, there is a mismatch between versions of a smart contract (e.g., between different services that rely on a specific version of a smart contract), interactions between these services and/or interactions between a service and a smart contract may fail due to differences between how different smart contracts perform transactions on the blockchain and differences between the transaction data each of these smart contracts persist to the blockchain.

Accordingly, techniques are needed to allow for consistent deployment of smart contracts in blockchain systems.

BRIEF SUMMARY

Certain embodiments provide a computer-implemented method for building libraries for invoking smart contracts on a blockchain. The method generally includes compiling first source code in a first programming language defining a smart contract comprising a set of operations to be executed on a blockchain into bytecode for the smart contract based on one or more of information about a compiler to be used to compile the first source code or dependencies specified in the first source code. The bytecode for the smart contract is wrapped in second source code in a second programming language. The second source code is compiled into a portion of a library package through which the smart contract can be programmatically invoked, wherein the portion of the library package specifies version information associated with the smart contract. The library package is deployed for use with the blockchain.

Certain embodiments provide a computer-implemented method for invoking smart contracts on a blockchain through a software library supporting a plurality of smart contracts. The method generally includes receiving a request from an external service to invoke a function in a library. Each function of a plurality of functions in the library corresponds to a specific version of a smart contract to be executed on a blockchain. The smart contract associated with the invoked function is executed on the blockchain based on data included in the request to invoke the function.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
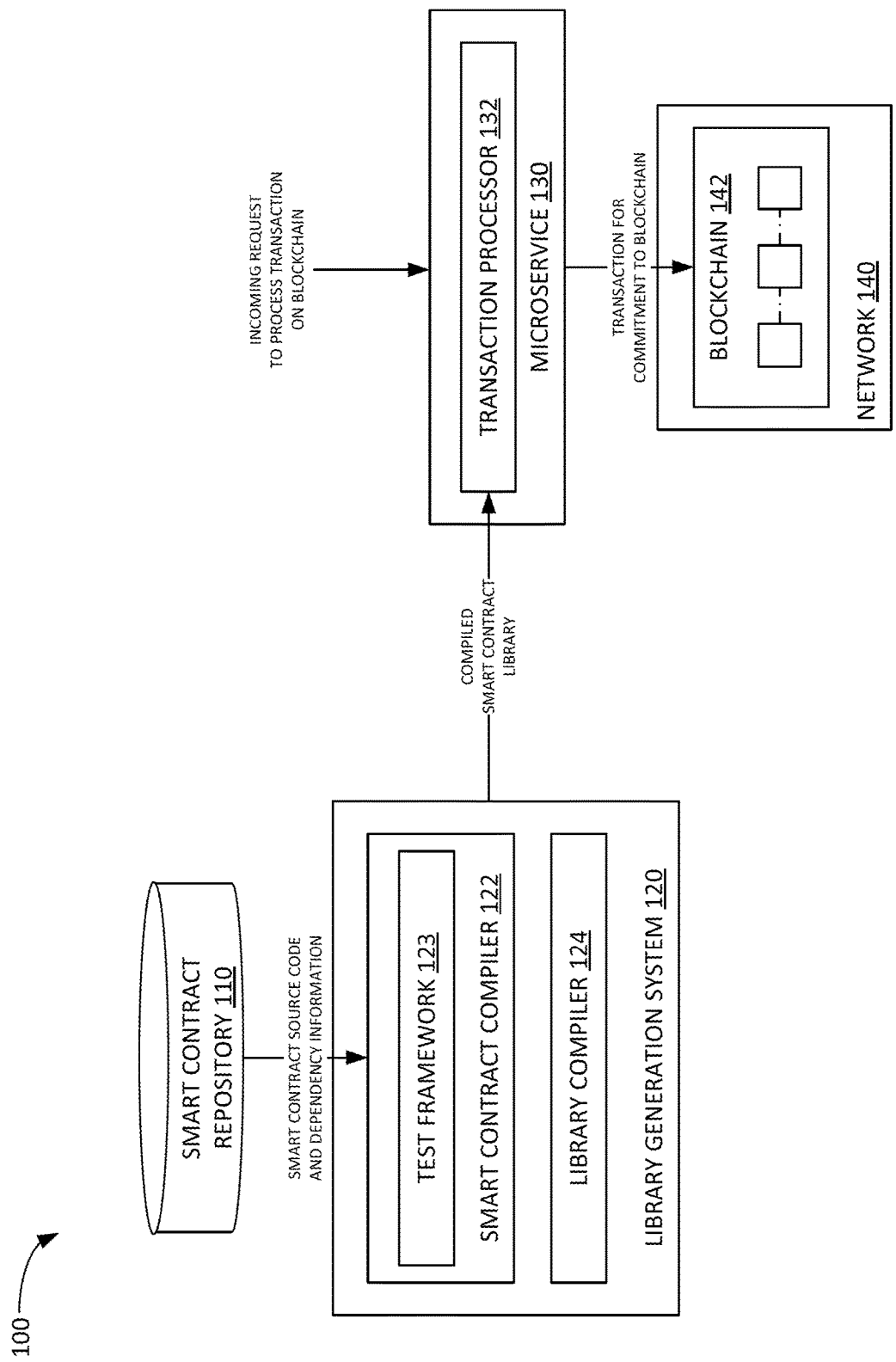
FIG. 1 depicts an example computing system for building, deploying, and executing smart contracts on a blockchain through a library into which smart contracts are wrapped, according to aspects of the present disclosure.

Transactions in cryptocurrency systems may be performed by executing smart contracts on a blockchain. These smart contracts generally define a series of operations to be executed on one or more blockchains in order to perform and commit to record one or more transactions to these blockchains. Generally, a smart contract may be implemented in a programming language and compiled into executable code that can be invoked in order to execute the series of operations on the one or more blockchains. For example, a smart contract may be written in a programming language such as Solidity, Rust, JavaScript, or other languages, and compiled into bytecode using one or more compilers. This bytecode may be executed to generate one or more tokens committed to a blockchain according to a standard that defines how smart contracts are defined and executed on a specific blockchain, such as the ERC20 token standard for the ETHEREUM® blockchain or other standards established for other blockchains that support the use of smart contracts to perform and commit transactions on these blockchains.

In some cases, smart contracts may suffer from version proliferation due to updates to the code used to implement the smart contract, updates to dependencies in these smart contracts (e.g., other libraries of code on which the operations defined in these smart contracts depend), changes to compilers used to compile smart contract code into executable bytecode. While some of these updates may not cause the resulting operations executed on a blockchain to change, some updates may cause the operations associated with a smart contract to differ sufficiently relative to a previous version of a smart contract such that services or microservices that consume and process data committed to a blockchain by the previous version of the smart contract may not work with newer versions of the smart contract. Further, because smart contracts may be integrated into services or microservices manually, version proliferation may cause the wrong version of a smart contract to be integrated into a service or microservice. This may, for example, cause some services or microservices to become incompatible with other services or microservices (e.g., when one service or microservice integrates a different version of a smart contract from another service or microservice). Further, because different services or microservices may use different versions of a smart contract, testing these services or microservices may be a process that uses significant computational resources to ensure compatibility between these services or microservices.

Aspects of the present disclosure provide techniques for compiling versions of smart contracts into a library through which smart contracts can be invoked programmatically. Generally, in compiling versions of smart contracts into a library, smart contracts can be compiled into bytecode, and the compiled bytecode can be wrapped into a library through which these smart contracts, and the compiled bytecode associated with these functions, can be invoked. Generally, each version of a smart contract may be represented by a separate function, set of functions, or class in the library. As a result, services or microservices through which smart contracts are invoked for execution on a blockchain can invoke these smart contracts through one or more function calls to the library in which a specific smart contract is invoked, and the identity of these function calls may generally remain static even as new versions of the smart contract, with different dependencies or compiled using different versions of a compiler, are developed and deployed. By doing so, aspects of the present disclosure may allow for consistency to be maintained across different services or microservices that invoke a smart contract or consume and process data committed to a blockchain using a specific version of a specific smart contract. This may reduce the amount of compute resources needed to test services or microservices and the interactions between these services or microservices, ensure consistency between different services in a computing environment, and allow for version updates to smart contracts used by these services or microservices to be easily coordinated.

Example Wrapping of Smart Contracts Into a Library

FIG. 1 illustrates an example computing environment 100 in which smart contracts are wrapped into a library for deployment and through which smart contracts are executed by invoking functions in the library, according to aspects of the present disclosure. As illustrated, computing environment 100 includes a smart contract repository 110, library generation system 120, microservice 130, and network 140.

Generally, library generation system 120 ingests source code defining a plurality of smart contracts to be wrapped in a library and dependency information for each smart contract, compiles the smart contracts into bytecode, and compiles the bytecode versions of the smart contracts into a library package through which the smart contracts can be programmatically invoked and executed. As illustrated, library generation system 120 includes a smart contract compiler 122 and a library compiler 124.

Smart contract compiler 122 generally uses the smart contract source code and dependency information retrieved and/or received from smart contract repository 110 and compiles the smart contract source code into bytecode which can be executed on one or more computing systems to execute one or more operations on a blockchain 142. In some aspects, the dependency information associated with source code defining any specific smart contract, or version thereof, may include information identifying a compiler to use in compiling the smart contract source code into byte code, the version of such a compiler, internal or external code libraries referenced by or integrated with a specific smart contract, or the like.

In some aspects, smart contract compiler 122 can commit the compiled bytecode for each smart contract to smart contract repository 110 in a versioned format. Smart contract repository 110 may, for example, implement a version control system in which different versions of smart contracts are maintained so that smart contract source code need not be re-compiled each time a library into which smart contracts are wrapped are compiled and deployed by library compiler 124. Generally, these version control systems can maintain versions of smart contract source code, and the associated bytecode into which the smart contract source code is compiled, according to the major, minor, patch semantic versioning scheme. Smart contract bytecode associated with major and minor revisions may be maintained separately; however, patch versions of a smart contract, which represent fixes to smart contract code that does not break the existing functionality of the smart contract (e.g., modify how the smart contract functions when executed at blockchain 142), add new features, or remove deprecated (but still used) features of the smart contract, may overwrite previous patch versions.

Smart contract compiler 122 may implement a variety of compilers and a variety of versions thereof to allow smart contract source code to be compiled using any appropriate compiler, according to the dependency information associated with the source code. In some aspects, where smart contract source code is to be compiled using different compilers (e.g., Truffle, Solc, etc.), different versions of the smart contract source code may be defined for the specific version of source code and specific compiler used to compile the smart contract source code. For example, if a library is to provide an interface by which the same smart contract, compiled using a first compiler and a second compiler, are executed, smart contract compiler 122 may generate a first bytecode package using the first compiler (which may be named [ContractName]-Compiler1) and a second bytecode package using the second compiler (which may be named [ContractName]-Compiler2). Generally, the output of smart contract compiler 122 may include bytecode which can be executed to execute defined operations on blockchain 142 and, in some aspects, a parseable file that provides information about the smart contract, such as the functions implemented by the smart contract, inputs, outputs, and the like. The parseable file may be, for example, a JavaScript Object Notation (JSON) file, an eXtendable Markup Language (XML) file, or other text file which can be parsed according to a defined schema to allow for information about a smart contract to be programmatically extracted from the parseable file.

In some aspects, smart contract repository 110 may include a plurality of compiler-specific repositories for the smart contract source code to be compiled and wrapped into a library. A compiler-specific repository may, for example, be associated with a specific compiler (e.g., Truffle, Solc, etc.) and a specific version of the compiler to use to compile the source code into bytecode. In some aspects, a compiler-specific repository may also be defined for a smart contract to be compiled using the latest version of a specific compiler and/or using multiple compilers. Smart contract compiler 122 can use information about the specific repository in which smart contract source is located to determine which compiler is to be used to compile the smart contract source code into bytecode. For example, smart contract compiler 122 may be dynamically or statically configured with a mapping associating each compiler-specific repository with its associated compiler, and smart contract compiler 122 can use this mapping to identify the appropriate compiler to use to compile the smart contract source code into bytecode.

In compiling the smart contract source code into bytecode, smart contract compiler 122 can use the dependency information to retrieve libraries associated with these dependencies prior to compiling the smart contract source code into bytecode. The libraries associated with these dependencies may be retrieved, for example, from a canonical source (e.g., a package manager, such as npm, rpm, yum, etc.; an open source repository, such as Github; or the like) or from a source specified by a developer of the smart contract source code. After retrieving the libraries associated with these dependencies, the smart contract source code and the retrieved libraries can be compiled into bytecode incorporating the smart contract source code and the retrieved libraries.

In some aspects, smart contract compiler 122 may include various test frameworks, such as test framework 123, that can be used to test a smart contract prior to compilation. A test framework and test data used to test a smart contract may be defined, for example, within one or more files included in the smart contract source code or other information retrieved from smart contract repository 110. The version of the test framework may, in some aspects, be associated with the version of the compiler to be used to compile the smart contract source code into bytecode. If the test framework is able to successfully test the smart contract source code (e.g., in a sandbox, such as a virtual machine, and interacting a private or temporary blockchain so that test transactions are not performed on and committed to a public blockchain such as blockchain 142), smart contract compiler 122 may proceed with compiling the smart contract source code (along with any libraries associated with dependencies identified in the source code) into bytecode for the smart contract. Otherwise, the compilation process may be halted, and information about the tests in the test framework that failed may be provided to one or more developers associated with the smart contract for further review.

After smart contract compiler 122 compiles the smart contract source code into bytecode, library compiler 124 can retrieve the compiled smart contract bytecode from smart contract repository 110 or directly from smart contract compiler 122 for use in building a library through which a plurality of smart contracts can be invoked. To generate this library, library compiler 124 generally wraps the bytecode in source code in a second programming language. The second programming language may be a programming language which can be compiled into executable code, such as JAVA®, C, or other computing languages.

Generally, library compiler 124 generates code that exposes mechanisms through which the plurality of smart contracts can be invoked. While the foregoing discusses these mechanisms with respect to classes, which is a programmatic construct in object-oriented programming languages, it should recognized that library compiler 124 can also or alternatively generate code using non-object-oriented programming languages that expose structures, modules, interfaces, or other mechanisms through which these smart contracts can be invoked.

In some aspects, library compiler 124 can generate code for a plurality of classes, with each class corresponding to a specific variant of a smart contract (e.g., a specific version of a smart contract, compiled using a specific compiler) and providing an interface through which that specific variant of the smart contract can be invoked. The functions included in each class may be, in some aspects, generated based on the parseable file including information about the smart contract. Each class may include, for example, a constructor function that allows for code to generate an instance of a smart contract, various functions that process input data, and a commit function that executes the smart contract against a blockchain and commits blocks evidencing the transaction to one or more blockchains.

After generating the code for these classes, library compiler 124 can compile the generated code into a library through which various smart contracts can be programmatically invoked. For example, where the generated code for the plurality of classes is written in the JAVA® programming language, the generated code for the library may be compiled into a Java Archive (JAR) file which can be executed on a computing system on which the library is deployed (e.g., a computing system hosting microservice 130). The library may subsequently be deployed to any services or microservices which use the smart contracts wrapped in the library in order to perform operations on blockchain 142.

Microservice 130 generally represents an application hosted on a computing resource (e.g., a physical server, virtual computer, compute container, etc.) which allows for external sources to execute smart contracts on blockchain 142. Generally, microservice 130 may be hosted on any computing device that can process blocks in a blockchain, such as a server, a compute cluster, desktop computers, laptop computers, or the like. It should be understood that microservice 130 may be distributed across multiple computing devices and may be executed as one or more cloud-based services, such as virtual machines or containers hosted on one or more physical computing systems. Microservice 130 is generally configured to process transactions for a cryptocurrency network, such as network 140, via invocation of one or more functions in a deployed library to execute smart contracts on blockchain 142. By way of example, network 140 may be a network such as ALGORAND™, BITCOIN™, ETHEREUM®, SOLANA™, STELLAR™, TRON™, and other cryptocurrency networks As illustrated, microservice 130 includes a transaction processor 132 which can interact with a smart contract library deployed to the microservice 130 to execute smart contracts on blockchain 142. To execute an operation defined by a smart contract on blockchain 142, transaction processor 132 may receive a request to invoke one or more functions exposed through the library. For example, in aspects where the library is written in an object-oriented language, the request may specify a function exposed by a specific class in the library to be executed. In another example, the request may specify a command to be executed, and this command may be associated with a specific smart contract to be executed on blockchain 142. This request generally includes data that can be used by one or more functions in the library to execute a specified smart contract on blockchain 142. Transaction processor can generate one or more blocks on a blockchain (e.g., generate tokens that allow for operations to be performed on-chain, such as tokens complying with the ERC-20 standard for an ETHEREUM® blockchain) and execute the appropriate bytecode wrapped in the library to satisfy the received request.

In some aspects, microservice 130 may be a service which acts as an intermediary between other microservices and blockchain 142. In such a case, the received request to invoke one or more functions exposed by the library may be received from an external service or microservice, for example, in a network call, through a command exposed by an interface conforming to the representation state transfer (REST) pattern (also known as a RESTful interface), or the like. In some aspects, microservice 130 may be integrated into a microservice, and the received request may be a function call or other command invocation exchanged between components of the microservice 130 hosted on a same virtual or physical compute instance.

Figure 2:
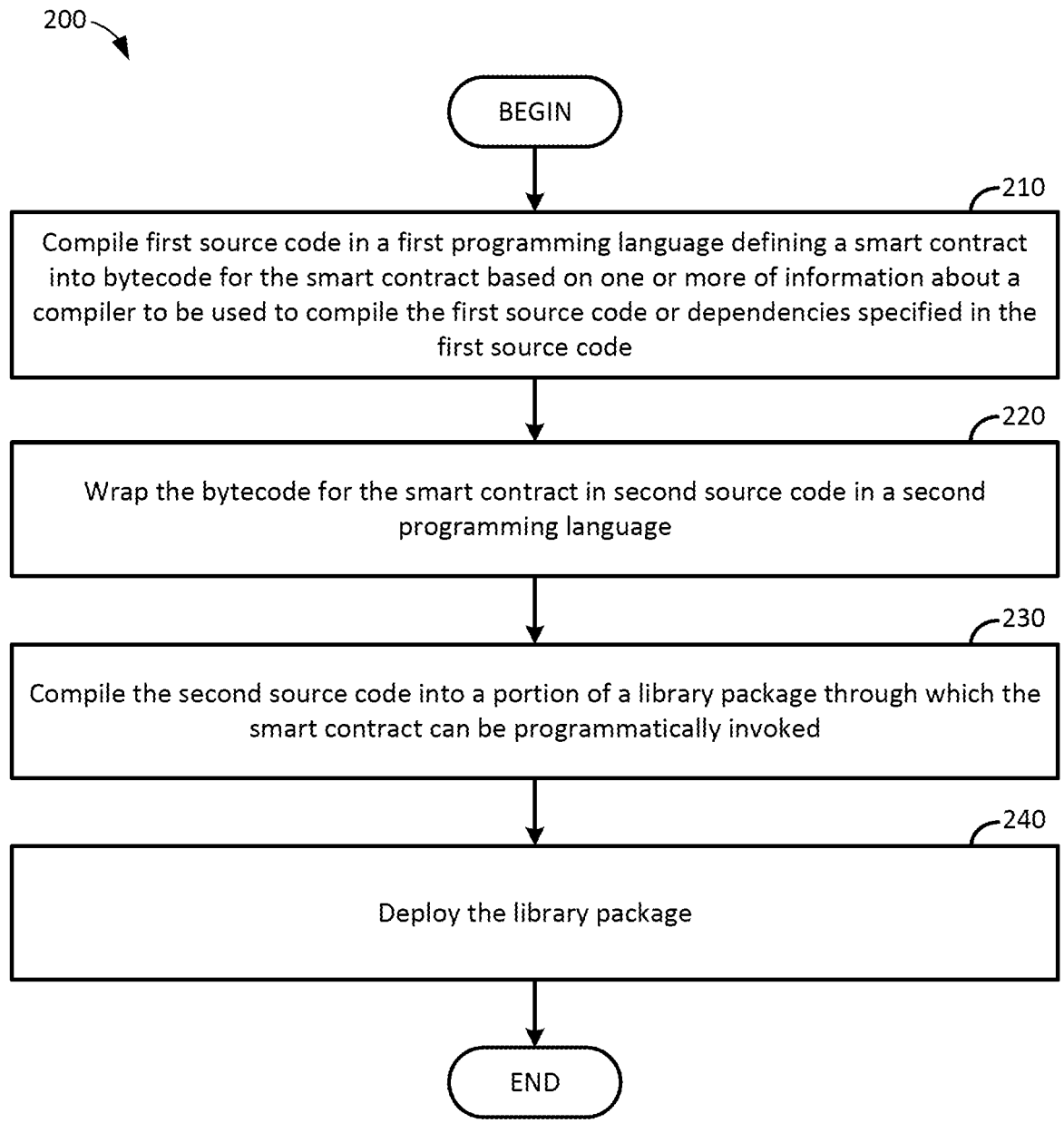
FIG. 2 illustrates example operations for wrapping smart contracts into a library through which smart contracts can be executed on a blockchain, according to aspects of the present disclosure.

Example Operations for Wrapping Smart Contracts in Libraries and Executing Smart Contracts Through Libraries FIG. 2 illustrates example operations 200 that may be performed by a computing system (e.g., library generation system 120 illustrated in FIG. 1) to build a library in which a plurality of smart contracts are wrapped, according to aspects of the present disclosure.

As illustrated, operations 200 begin at block 210, with compiling first source code in a first programming language defining a smart contract comprising a set of operations to be executed on a blockchain into bytecode for the smart contract based on one or more of information about a compiler to be used to compile the first source code or dependencies specified in the first source code.

In some aspects, the information about the compiler to be used to compile the first source code may include a version of a compiler to be used to compile the first source code. In such a case, the first source code may be compiled using specified version of the compiler, and the resulting bytecode may include version information for the smart contract and information identifying the compiler and version thereof used to generate the bytecode.

In some aspects, source code for smart contracts to be wrapped in a library (including the first source code illustrated in FIG. 2) may be stored in different repositories, and each of these repositories may be associated with specific dependencies to use in compiling the first source code. For example, each respective repository may be associated with a specific version of a specific compiler to use in order to compile the smart contract source code stored in the respective repository. In compiling the first source code into bytecode, a compiler can use mappings defined between repositories and versions of dependencies used by the smart contract source code to identify the appropriate versions of the dependencies to use in compiling the smart contract source code. In some aspects, dependencies may be retrieved and provided as input to a compiler, along with the source code for these smart contracts, and the compiler can compile the smart contract source code and the retrieved dependencies into the bytecode for the smart contract.

In some aspects, compiling the first source code may be based on testing the smart contract using a version of a test framework associated with a version of a compiler used to compile the first source code. Generally, these tests may determine whether compilation of smart contract source code into bytecode and the subsequent wrapping of the bytecode into a library can proceed. These tests may include, for example, tests written for a smart contract as well as tests generated by automated verification systems, such as Satisfiability Modulo Theory (SMT) checkers or fuzzer tests that inject corrupt or invalid data to ensure that the smart contract fails gracefully (e.g., handles errors without crashing unexpectedly or otherwise leaving the blockchain in a partially changed state). This test framework may, for example, define various operations to be performed (e.g., on a private blockchain, so that a public blockchain such as the ETHEREUM® blockchain is not polluted with test transactions) and define the expected results of these operations. If the source code passes the tests defined for the test framework (e.g., if the operations generate the expected results), compilation of the first source code into bytecode and the subsequent wrapping of the bytecode into a library may proceed. Otherwise, one or more errors may be raised, and compilation may be blocked until such time as the source code is corrected and the tests defined in the test framework succeed in verifying that the smart contract source code operates as expected.

At block 220, operations 200 proceed with wrapping the bytecode for the smart contract in second source code in a second programming language.

In some aspects, wrapping the bytecode for the smart contract in second source code in the second programming language may include generating an interface associated with the second source code. The interface generally exposes a mechanism to one or more microservices through which the smart contract is invoked. For example, the interface may be one or more functions that allow a smart contract to be represented as an object at a microservice and allow for various operations to be performed using the object. This interface may include, for example, a class with various functions that allow for a smart contract object to be created, that allow for various tokens or blocks to be created on a blockchain, that allow for various data processing and manipulation operations to be performed prior to creating tokens or blocks on a blockchain to evidence the occurrence of a transaction via a smart contract, and the like.

At block 230, operations 200 proceed with compiling the second source code into a portion of a library package through which the smart contract can be programmatically invoked. Generally, the portion of the library package specifies or is otherwise associated with version information associated with the smart contract. For example, where the second source code is implemented in an object oriented programming language, such as JAVA®, the portion of the library package may be a class exposed by the library package. In other examples, the portion of the library package may include interfaces, commands, or other mechanisms by which execution of the smart contract can be invoked.

In some aspects, the library package may include a plurality of additional portions. Each additional portion of the plurality of additional portions may be associated with a different version of the smart contract or a different smart contract. For example, assume that the library package is used to wrap a n versions of a first smart contract and m versions of a second smart contract. The library package may include n+m portions, with each portion being associated with a specific version of a specific smart contract. The portion for the first smart contract may be named, for example, SmartContract1v{1, 2, . . . , n} and may provide interfaces through which the bytecode associated with the relevant version of the first smart contract can be executed in order to execute operations on a blockchain. Similarly, the portions for the second smart contract may be named SmartContract2v{1, 2, . . . , m} and likewise provide interfaces through which the relevant bytecode can be executed.

At block 240, operations 200 proceed with deploying the library package. The library package may be deployed, for example, to one or more services or microservices for execution. For example, the library package may be deployed to a gateway service which exposes a mechanism by which a variety of microservices can execute smart contracts on a public or private blockchain. In another aspect, the library package may be deployed to a plurality of devices on which different microservices are hosted such that the library is integrated with software defined for these microservices and executes locally on the compute resources hosting these microservices. In some aspects, the library package may be made available (e.g., in a smart contract repository 110) for download and integration into other software projects.

The method of Claim 1, wherein deploying the library package comprises deploying the library package to one or more microservices that interact with the blockchain.

Figure 3:
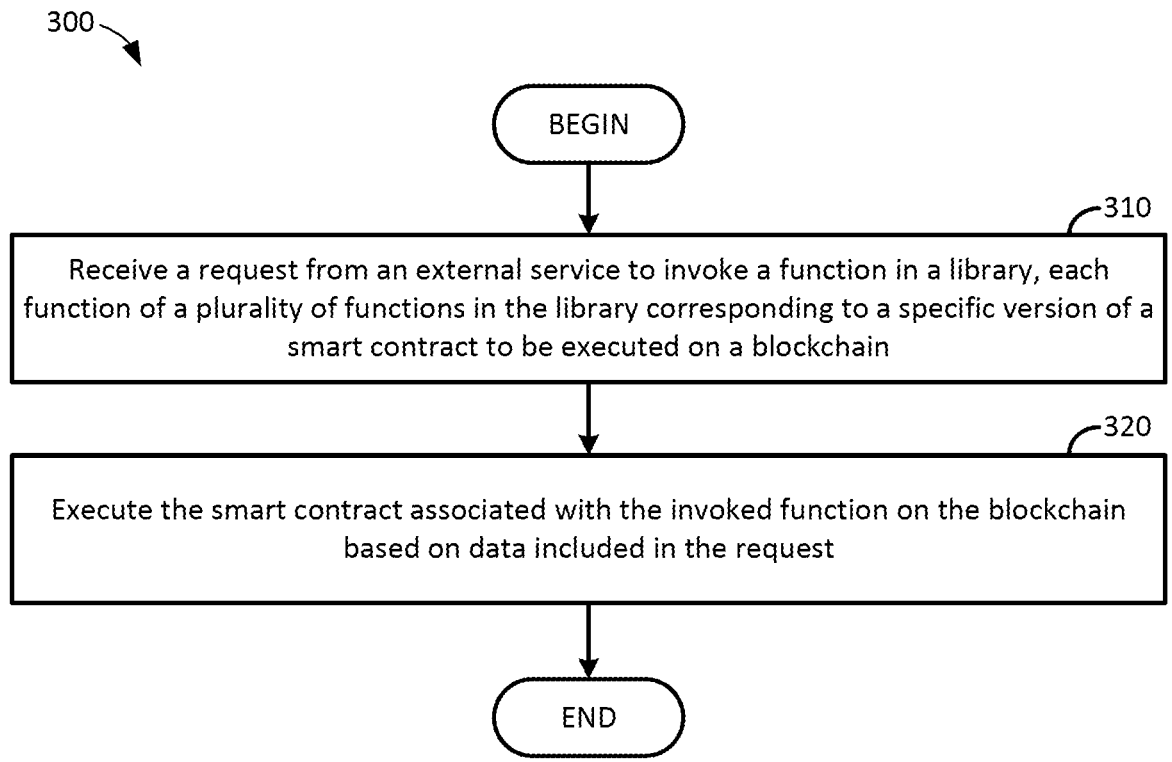
FIG. 3 illustrates example operations for executing smart contracts on a blockchain through a library in which smart contracts are wrapped, according to aspects of the present disclosure.

FIG. 3 illustrates example operations 300 for executing smart contracts on a blockchain through a library in which smart contracts are wrapped, according to aspects of the present disclosure. Operations 300 may be performed, for example by a transaction processor hosted by or implemented in a microservice, such as transaction processor 132 illustrated in FIG. 1.

As illustrated, operations 300 may begin at block 310, with receiving a request to invoke a function in a library, each respective function of a plurality of functions in the library corresponding to a respective smart contract to be executed on a blockchain. The request may, in some aspects, be received at a microservice that interacts with the blockchain.

In some aspects, each respective smart contract comprises a version of a smart contract associated with a unique set of dependencies. For example, the unique set of dependencies include other libraries with which the smart contract interacts or with which the smart contract is compiled and included in bytecode that executes the version of the smart contract. In some aspects, the smart contract is associated with a version of a compiler used to compile the respective smart contract into bytecode executable through invoking the respective function.

At block 320, operations 300 proceed with executing a smart contract associated with the invoked function on the blockchain based on data included in the request.

Figure 4:
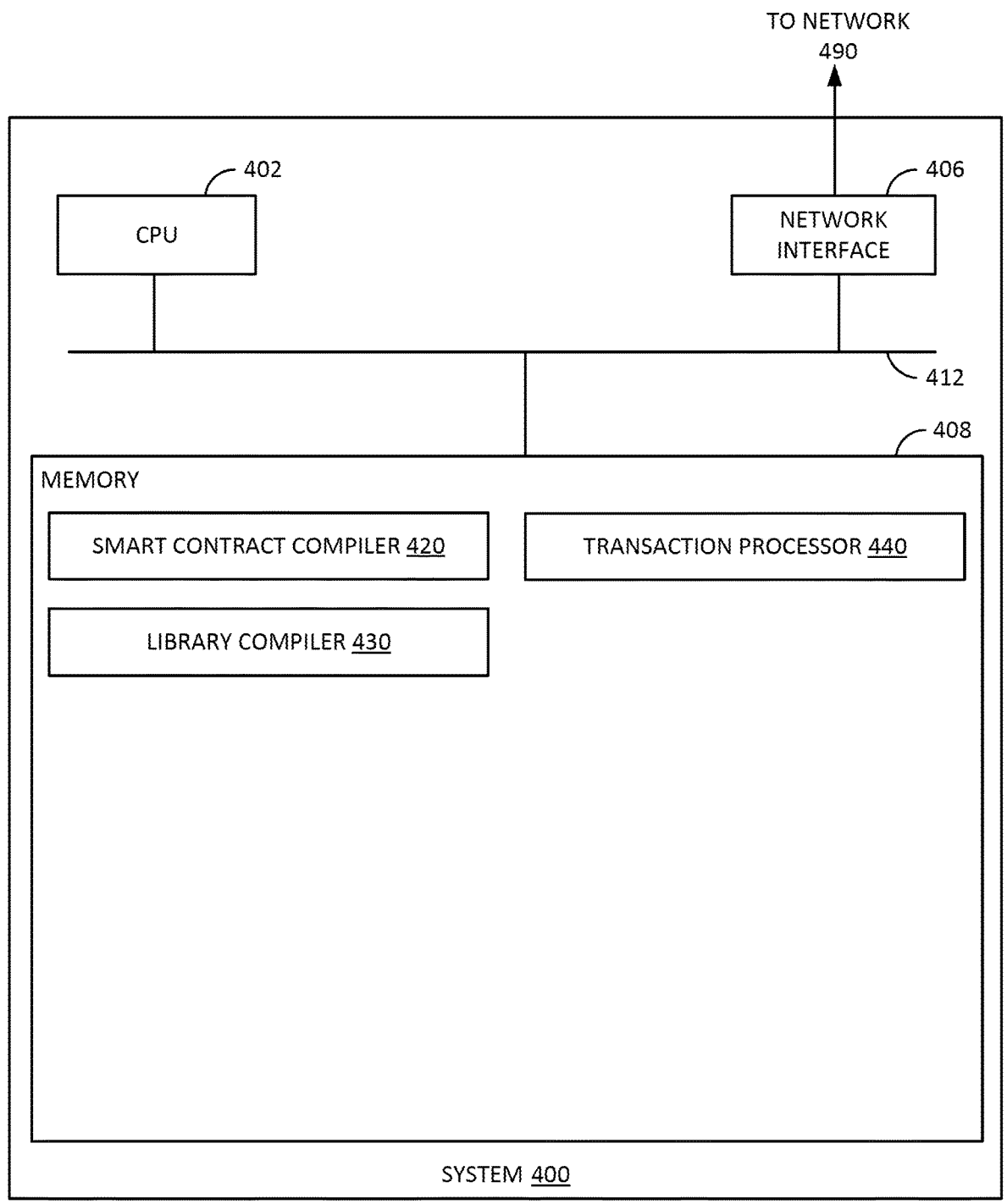
FIG. 4 illustrates an example system on which embodiments of the present disclosure can be performed.

Example System for Building and Using Libraries to Invoke Smart Contracts on a Blockchain FIG. 4 illustrates an example system 400 configured to perform the methods described herein, including, for example, operations 200 of FIG. 2 and/or operations 300 of FIG. 3. In some embodiments, system 400 may act as a system which compiles and deploys libraries for invoking smart contracts on a blockchain, such as library generation system 120 illustrated in FIG. 1, and a microservice on which functions exposed by these libraries are invoked to execute smart contracts on a blockchain, such as microservice 130 illustrated in FIG. 1.

As shown, system 400 includes a central processing unit (CPU) 402, network interface 406 through which system 400 is connected to network 490 (which may be a local network, an intranet, the internet, or any other group of computing devices communicatively connected to each other), a memory 408, and an interconnect 412. The network interface 406 may be used to receive requests to execute smart contracts on a blockchain through one or more requests invoking functions in a library in which multiple smart contracts are wrapped (e.g., as depicted and described with respect to FIGS. 1 through 3).

CPU 402 may retrieve and execute programming instructions stored in the memory 408. Similarly, the CPU 402 may retrieve and store application data residing in the memory 408. The interconnect 412 transmits programming instructions and application data, among the CPU 402, network interface 406, and memory 408.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes a smart contract compiler 420, library compiler 430, and transaction processor 440.

Smart contract compiler 420 may generally correspond to smart contract compiler 122 illustrated in FIG. 1. Generally, smart contract compiler 420 retrieves source code defining a version of a smart contract from a repository, identifies the dependencies associated with the version of the smart contract, and compiles the smart contract source code into executable bytecode which can be used to execute the operations defined by the smart contract on a blockchain. In some aspects, smart contract compiler 420 may also include testing functionality that allows for a testing framework associated with a version of a smart contract code compiler to perform various tests prior to compiling the smart contract source code into bytecode. Generally, the testing framework may block smart contract compiler 420 from compiling the smart contract source code into bytecode and subsequent wrapping of this bytecode by library compiler 430 until such time as any errors in the smart contract source code are rectified and the smart contract source code passes the tests defined for the smart contract.

Library compiler 430 generally corresponds to library compiler 124 illustrated in FIG. 1. Generally, library compiler 430 compiles the bytecode generated by smart contract compiler 420 into a library through which these smart contracts can be programmatically invoked. The library generated by library compiler 430 may include a plurality of classes, with each class being associated with a specific version of a specific smart contract. Because the library generated by library compiler 430 provides a consistent interface through which microservices or other applications that interact with a blockchain can invoke specific smart contracts, aspects of the present disclosure may thus provide a service that allows for consistent usage of specific versions of smart contracts and guarantees consistency between different, related, services that may depend on the same data for consistent and accurate operations. The library generated by library compiler 430 may be deployed to transaction processor 440 and/or services or microservices external to processing system 400.

Transaction processor 440 generally corresponds to transaction processor 132 illustrated in FIG. 1. Generally, transaction processor 440 provides an interface through which requests to perform various transactions on a blockchain, including transactions performed by executing a smart contract on the blockchain, are received. To execute a smart contract on the blockchain, transaction processor 440 can identify the appropriate class and function(s) to invoke in the library generated by library compiler 430 and deployed to transaction processor 440. By invoking the appropriate class and function(s) through the library deployed to transaction processor 440, transaction processor 440 can cause a specific version of a specific smart contract to be executed on the blockchain without the specific smart contract bytecode being integrated into the code defining transaction processor 440.

Example Clauses

Implementation details for various aspects of the present disclosure are described in the following numbered clauses.

Clause 1: A method, comprising: compiling first source code in a first programming language defining a smart contract comprising a set of operations to be executed on a blockchain into bytecode for the smart contract based on one or more of information about a compiler to be used to compile the first source code or dependencies specified in the first source code; wrapping the bytecode for the smart contract in second source code in a second programming language; compiling the second source code into a portion of a library package through which the smart contract can be programmatically invoked, wherein the portion of the library package specifies version information associated with the smart contract; and deploying the library package.

Clause 2: The method of Clause 1, wherein the library package comprises a plurality of additional portions, each additional portion of the plurality of additional classes being associated with one of a different version of the smart contract or a different smart contract.

Clause 3: The method of any one of Clauses 1 or 2, wherein wrapping the bytecode for the smart contract in second source code in the second programming language comprises generating an interface associated with the second source code, wherein the interface exposes a mechanism to one or more microservices through which the smart contract is invoked.

Clause 4: The method of any one of Clauses 1 through 3, wherein the information about the compiler to be used to compile the first source code comprises a version of a compiler to be used to compile the first source code.

Clause 5: The method of any one of Clauses 1 through 4, further comprising determining a version of the one or more dependencies to be used to compile the first source code based on a repository in which the first source code is stored.

Clause 6: The method of Clause 5, wherein the version of the one or more dependencies comprises a version of the compiler to be used to compile the first source code.

Clause 7: The method of any one of Clauses 1 through 6, wherein compiling the first source code into the bytecode is based on testing the smart contract using a version of a test framework associated with a version of a compiler used to compile the first source code.

Clause 8: The method of any one of Clauses 1 through 7, wherein deploying the library package comprises deploying the library package to one or more microservices that interact with the blockchain.

Clause 9: A method, comprising: receiving a request to invoke a function in a library, each respective function of a plurality of functions in the library corresponding to a respective smart contract to be executed on a blockchain; and executing a smart contract associated with the invoked function on the blockchain based on data included in the request.

Clause 10: The method of Clause 9, wherein each respective smart contract comprises a version of a smart contract associated with a unique set of dependencies.

Clause 11: The method of any one of Clauses 9 or 10, wherein the smart contract is associated with a version of a compiler used to compile the respective smart contract into bytecode executable through invoking the respective function.

Clause 12: The method of any one of Clauses 9 through 11, wherein the request is received at a microservice that interacts with the blockchain.

Clause 13: A processing system, comprising: a memory having executable instructions stored thereon; and a processor configured to execute the executable instructions to perform the operations of any one of Clauses 1 through 12.

Clause 14: A processing system, comprising: means for performing the operations of any one of Clauses 1 through 12.

Clause 15: A computer-readable medium having instructions stored thereon which, when executed by a processor, performs the operations of any one of Clauses 1 through 12.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
compiling first source code in a first programming language defining a smart contract comprising a set of operations to be executed on a blockchain into bytecode for the smart contract based on one or more of information about a compiler to be used to compile the first source code or dependencies specified in the first source code;
wrapping the bytecode for the smart contract in second source code in a second programming language;
compiling the second source code into a portion of a library package through which the smart contract can be programmatically invoked, wherein the portion of the library package specifies version information associated with the smart contract; and
deploying the library package.

2. The method of claim 1, wherein the library package comprises a plurality of additional portions, each additional portion of the plurality of additional portion being associated with one of a different version of the smart contract or a different smart contract.

3. The method of claim 1, wherein wrapping the bytecode for the smart contract in second source code in the second programming language comprises generating an interface associated with the second source code, wherein the interface exposes a mechanism to one or more microservices through which the smart contract is invoked.

4. The method of claim 1, wherein the information about the compiler to be used to compile the first source code comprises a version of a compiler to be used to compile the first source code.

5. The method of claim 1, further comprising determining a version of the one or more dependencies to be used to compile the first source code based on a repository in which the first source code is stored.

6. The method of claim 5, wherein the version of the one or more dependencies comprises a version of the compiler to be used to compile the first source code.

7. The method of claim 1, wherein compiling the first source code into the bytecode is based on testing the smart contract using a version of a test framework associated with a version of a compiler used to compile the first source code.

8. The method of claim 1, wherein deploying the library package comprises deploying the library package to one or more microservices that interact with the blockchain.

9. A processing system, comprising:
a memory having executable instructions stored thereon; and
a processor configured to execute the executable instructions to cause the processing system to:
compile first source code in a first programming language defining a smart contract comprising a set of operations to be executed on a blockchain into bytecode for the smart contract based on one or more of information about a compiler to be used to compile the first source code or dependencies specified in the first source code;
wrap the bytecode for the smart contract in second source code in a second programming language;
compile the second source code into a portion of a library package through which the smart contract can be programmatically invoked, wherein the portion of the library package specifies version information associated with the smart contract; and
deploy the library package.

10. The processing system of claim 9, wherein the library package comprises a plurality of additional portions, each additional portion of the plurality of additional portions being associated with one of a different version of the smart contract or a different smart contract.

11. The processing system of claim 9, wherein in order to wrap the bytecode for the smart contract in second source code in the second programming language, the processor is configured to cause the processing system to generate an interface associated with the second source code, wherein the interface exposes a mechanism to one or more microservices through which the smart contract is invoked.

12. The processing system of claim 9, wherein the information about the compiler to be used to compile the first source code comprises a version of a compiler to be used to compile the first source code.

13. The processing system of claim 9, wherein the processor is further configured to cause the processing system to determine a version of the one or more dependencies to be used to compile the first source code based on a repository in which the first source code is stored.

14. The processing system of claim 13, wherein the version of the one or more dependencies comprises a version of the compiler to be used to compile the first source code.

15. The processing system of claim 9, wherein in order to compile the first source code into the bytecode, the processor is configured to compile the first source code based on testing the smart contract using a version of a test framework associated with a version of a compiler used to compile the first source code.

16. The processing system of claim 9, wherein in order to deploy the library package, the processor is configured to deploy the library package to one or more microservices that interact with the blockchain.

17. A method, comprising:
receiving a request to invoke a function in a library, each respective function of a plurality of functions in the library corresponding to a respective smart contract to be executed on a blockchain; and
executing a smart contract associated with the invoked function on the blockchain based on data included in the request.

18. The method of claim 17, wherein each respective smart contract comprises a version of a smart contract associated with a unique set of dependencies.

19. The method of claim 17, wherein the smart contract is associated with a version of a compiler used to compile the respective smart contract into bytecode executable through invoking the respective function.

20. The method of claim 17, wherein the request is received at a microservice that interacts with the blockchain.

* * * * *